DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 16, 1970

875 O.G. 361

T875,014

OPAQUE PHOTOGRAPHIC ELEMENT

Robert B. Campbell, Pittsford, Lauri W. Kiikka, Victor, and George R. Secrist, Webster, N.Y. (all of 1669 Lake Ave., Rochester, N.Y. 14650)

Filed Aug. 4, 1969, Ser. No. 847,258
**Int. Cl. G03c *1/86***
U.S. Cl. 96—85
1 Sheet Drawing. 14 Pages Specification

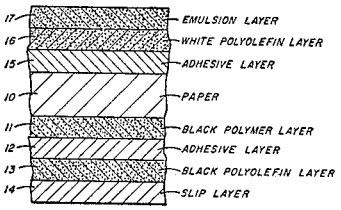

An opaque light-sensitive photographic element is prepared by coating a paper support on one surface with a polymer layer containing sufficient carbon to render the element substantially opaque and to provide a high degree of static protection. An extruded polyolefin layer containing additional carbon is adhered to the polymer layer by means of a polyalkyleneimine and a casein layer containing a slip agent is coated over the polyolefin layer which preferably has been corona activated.

An extruded polyolefin layer containing a light colored pigment such as titanium dioxide is adhered to the other side of the paper by means of a polyalkyleneimine and a gelatin-silver halide emulsion layer is coated on the resulting light colored polyolefin layer preferably following corona activation of the polyolefin layer. The original paper support is preferably tub sized with a light colored pigment composition before applying the mentioned polymer layers. The opaque element is especially useful in a photographic diffusion transfer process of the type in which the element is exposed to a subject and, while in a camera, is rolled into contact with an opaque receiving element with a layer of processing solution interposed. The opaque element allows withdrawal of the resulting sandwich from the camera and processing to take place in the light.

June 16, 1970 R. B. CAMPBELL ET AL T875,014
OPAQUE PHOTOGRAPHIC ELEMENT
Filed Aug. 4, 1969
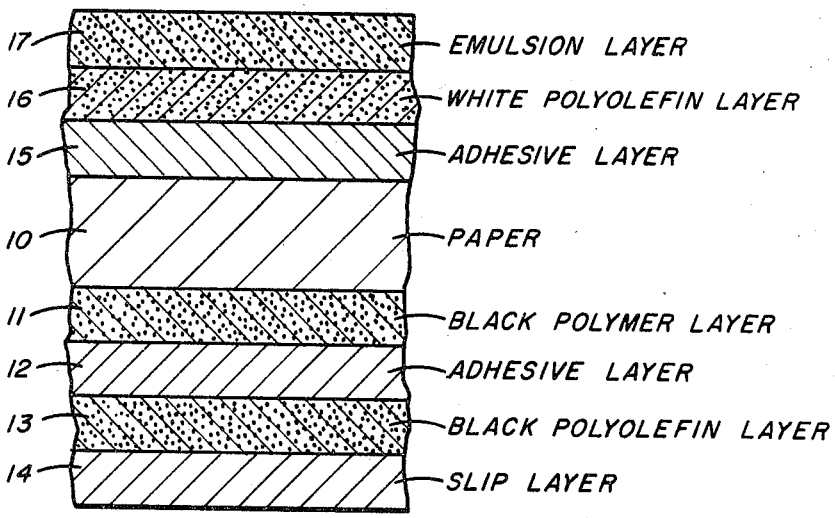
ROBERT B. CAMPBELL
LAURI W. KIIKKA
GEORGE R. SECRIST
INVENTORS
BY Walter O. Hodsdon
W. H. McDowell
ATTORNEY & AGENT